(12) United States Patent
Leeland et al.

(10) Patent No.: US 10,539,970 B2
(45) Date of Patent: *Jan. 21, 2020

(54) HVAC CONTROLLER FOR A VARIABLE AIR VOLUME (VAV) BOX

(71) Applicant: Honeywell International Inc., Morris Plains, NJ (US)

(72) Inventors: Shanna Leeland, Duvall, WA (US); Brent Barker, Bellevue, WA (US); Albert Holaso, Celebration, FL (US); Jennifer Teves, Bel Aire, KS (US); Kevin Clinger, Monroe, WA (US); Philip Shen, Redmond, WA (US); Fred Becher, Everett, WA (US); Kevin Callahan, Seattle, WA (US)

(73) Assignee: Honeywell International Inc., Morris Plains, NJ (US)

( * ) Notice: Subject to any disclaimer, the term of this patent is extended or adjusted under 35 U.S.C. 154(b) by 58 days.

This patent is subject to a terminal disclaimer.

(21) Appl. No.: 15/950,003

(22) Filed: Apr. 10, 2018

(65) Prior Publication Data

US 2018/0231994 A1    Aug. 16, 2018

Related U.S. Application Data

(63) Continuation of application No. 14/692,711, filed on Apr. 21, 2015, now Pat. No. 9,971,363.

(51) Int. Cl.
*G05D 23/00* (2006.01)
*G05D 23/19* (2006.01)
*G05D 23/13* (2006.01)

(52) U.S. Cl.
CPC ..... *G05D 23/1393* (2013.01); *G05D 23/1905* (2013.01)

(58) Field of Classification Search
CPC ..................................... G05D 23/19
See application file for complete search history.

(56) References Cited

U.S. PATENT DOCUMENTS

| | | |
|---|---|---|
| 4,591,093 A | 5/1986 | Elliott |
| 4,843,084 A | 6/1989 | Parker et al. |
| 5,005,636 A | 4/1991 | Haessig |
| 5,251,815 A | 10/1993 | Foye |
| 5,337,574 A | 8/1994 | Dick |
| 5,341,988 A | 8/1994 | Rein et al. |

(Continued)

OTHER PUBLICATIONS

U.S. Appl. No. 14/692,711, filed Apr. 21, 2015.

(Continued)

*Primary Examiner* — Mark A Connolly
(74) *Attorney, Agent, or Firm* — Seager Tufte & Wickhem LLP

(57) ABSTRACT

An HVAC controller configured to control a VAV box including a damper may include a temperature sensor that is configured to sense a temperature proximate the HVAC controller and a touch screen user interface that is configured to display the sensed temperature and to enable a user to input a temperature set point. A controller may be operatively coupled to the touch screen user interface and the temperature sensor and may be configured to regulate operation of the VAV box in accordance with the sensed temperature and the temperature set point. The HVAC controller may be programmed with a test and balance procedure that is user-accessible via the touch screen user interface.

20 Claims, 19 Drawing Sheets

(56) References Cited

U.S. PATENT DOCUMENTS

| | | |
|---|---|---|
| 5,350,113 A | 9/1994 | Coogan |
| 5,381,950 A | 1/1995 | Aldridge |
| 5,535,814 A | 7/1996 | Hartman |
| 5,768,121 A | 6/1998 | Federspiel |
| 5,786,525 A | 7/1998 | Freund et al. |
| 6,079,627 A | 6/2000 | Kettler |
| RE37,245 E | 6/2001 | Scholten et al. |
| 7,177,776 B2 | 2/2007 | Whitehead |
| 7,775,452 B2 | 8/2010 | Shah et al. |
| 7,783,977 B2 | 8/2010 | Stadheim et al. |
| 8,038,075 B1 | 10/2011 | Walsh |
| 8,356,761 B2 | 1/2013 | Kalore |
| 9,971,363 B2 | 5/2018 | Leeland et al. |
| 9,976,763 B2 | 5/2018 | Leeland et al. |
| 2004/0182943 A1 | 9/2004 | Hull |
| 2006/0190138 A1 | 8/2006 | Stone et al. |
| 2007/0277542 A1 | 12/2007 | Rao |
| 2009/0113037 A1 | 4/2009 | Pouchak |
| 2009/0158188 A1 | 6/2009 | Bray et al. |
| 2009/0209195 A1 | 8/2009 | Fincher et al. |
| 2010/0102135 A1 | 4/2010 | Alles |
| 2012/0137876 A1 | 6/2012 | Miller |
| 2013/0190933 A1 | 7/2013 | DeAngelis et al. |
| 2014/0000861 A1 | 1/2014 | Barrett et al. |
| 2015/0176853 A1 | 6/2015 | Uden |
| 2016/0313018 A1 | 10/2016 | Leeland et al. |
| 2016/0313748 A1 | 10/2016 | Leeland et al. |

OTHER PUBLICATIONS

3 DZK Daikin Zoning Kit, Installation Manual, Nov. 2013, http://www.daikinac.com/content/assets/DOC/InstallationManuals/DZK%20Installation%20Manual.pdf.

C210 Controller & C680RF thermostats, Installation and Operation Instructions, Nov. 9, 2013, http://www.nulifeair.com.au/SiteMedia/w3svc720/Uploads/Documents/C21 0%20&%20C680RF%201i%20.pdf.

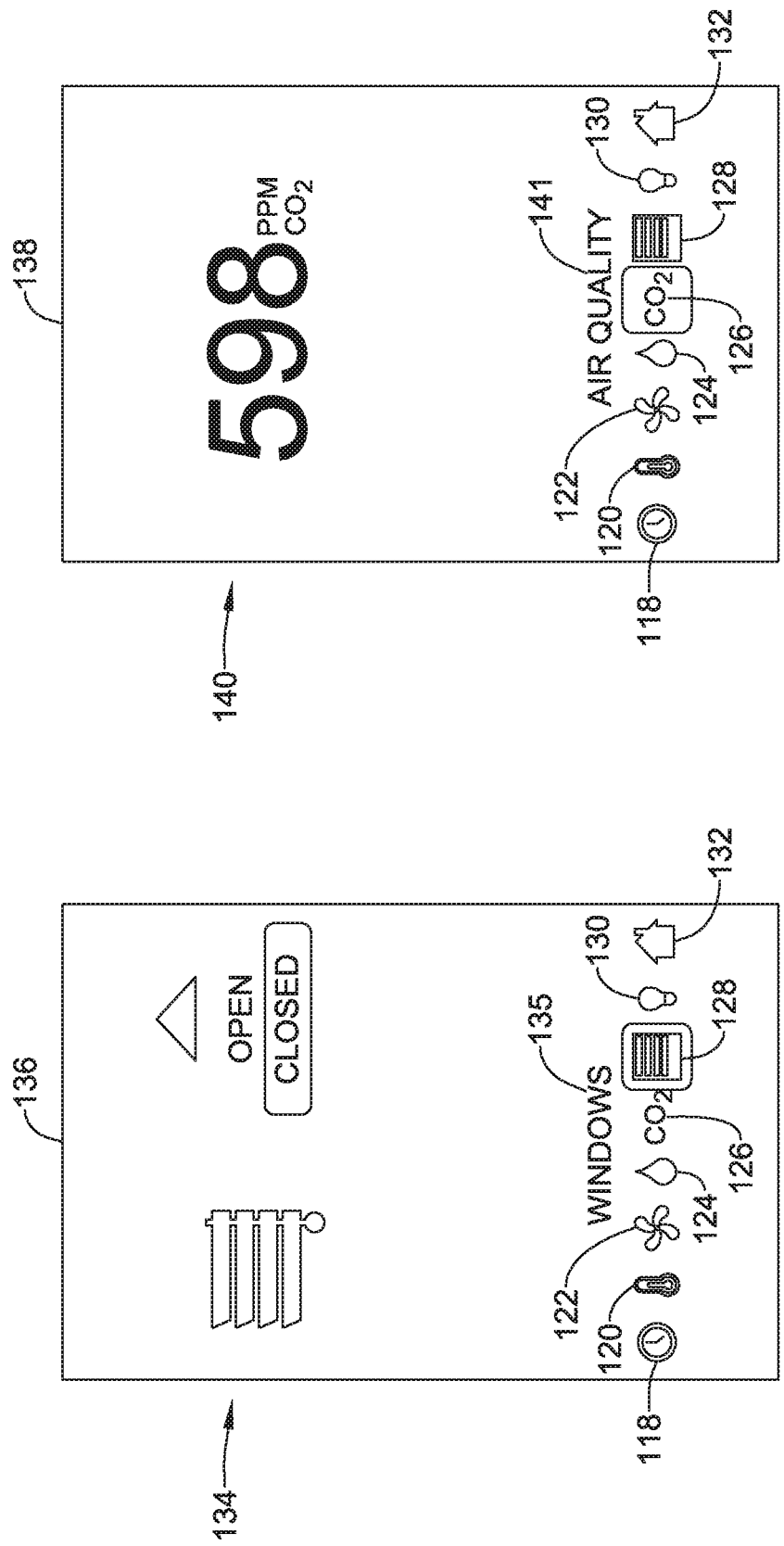

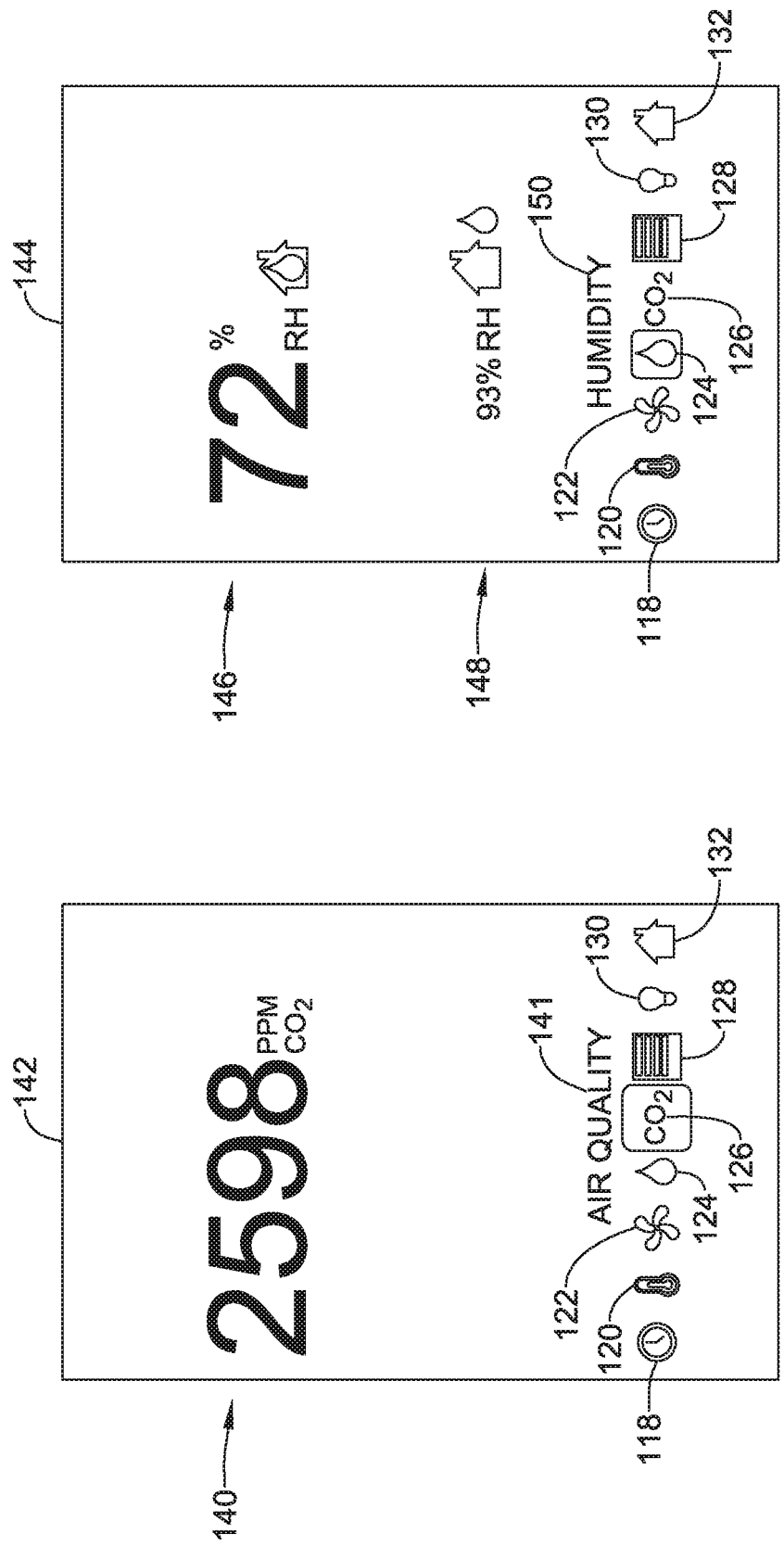

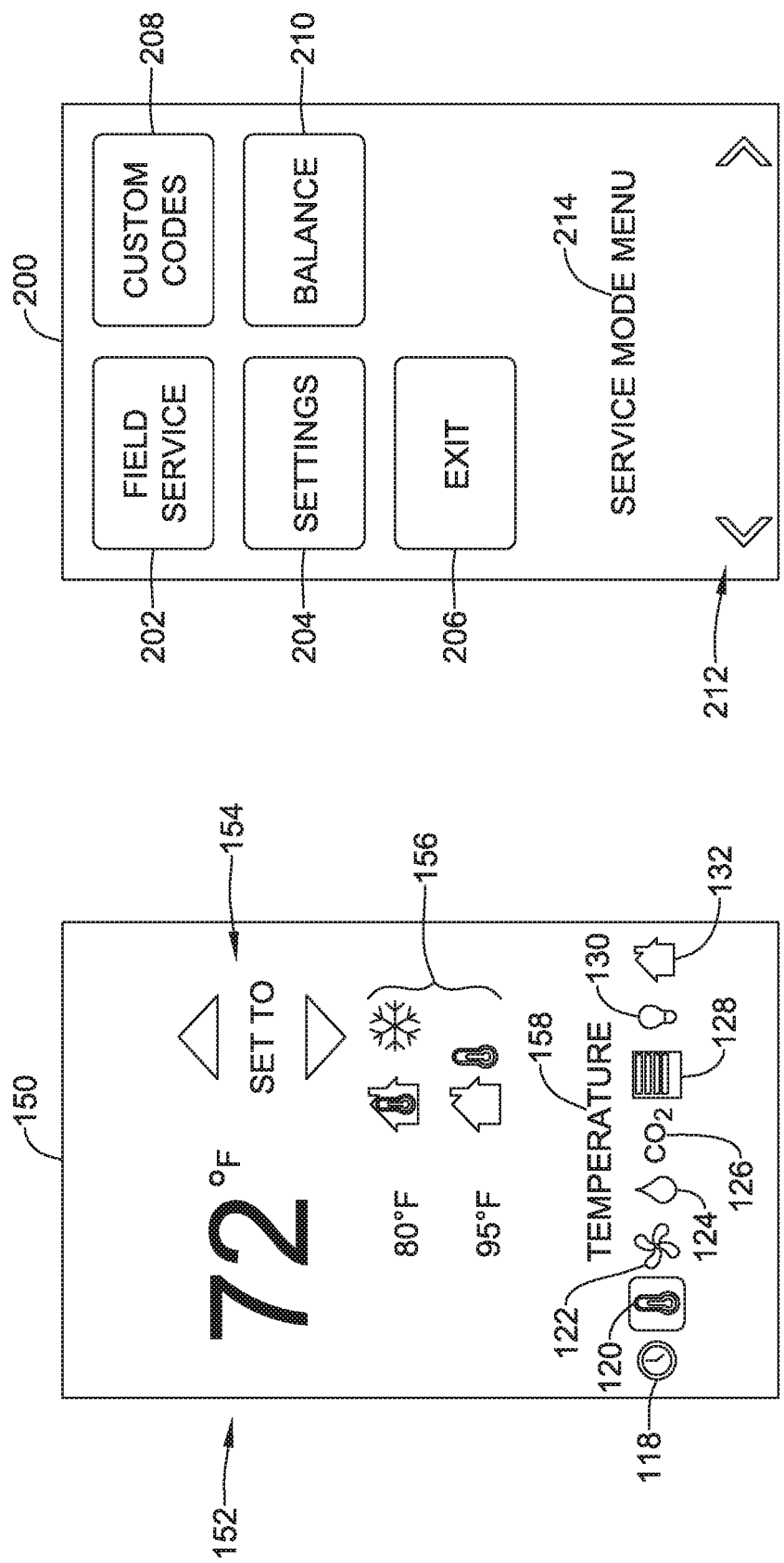

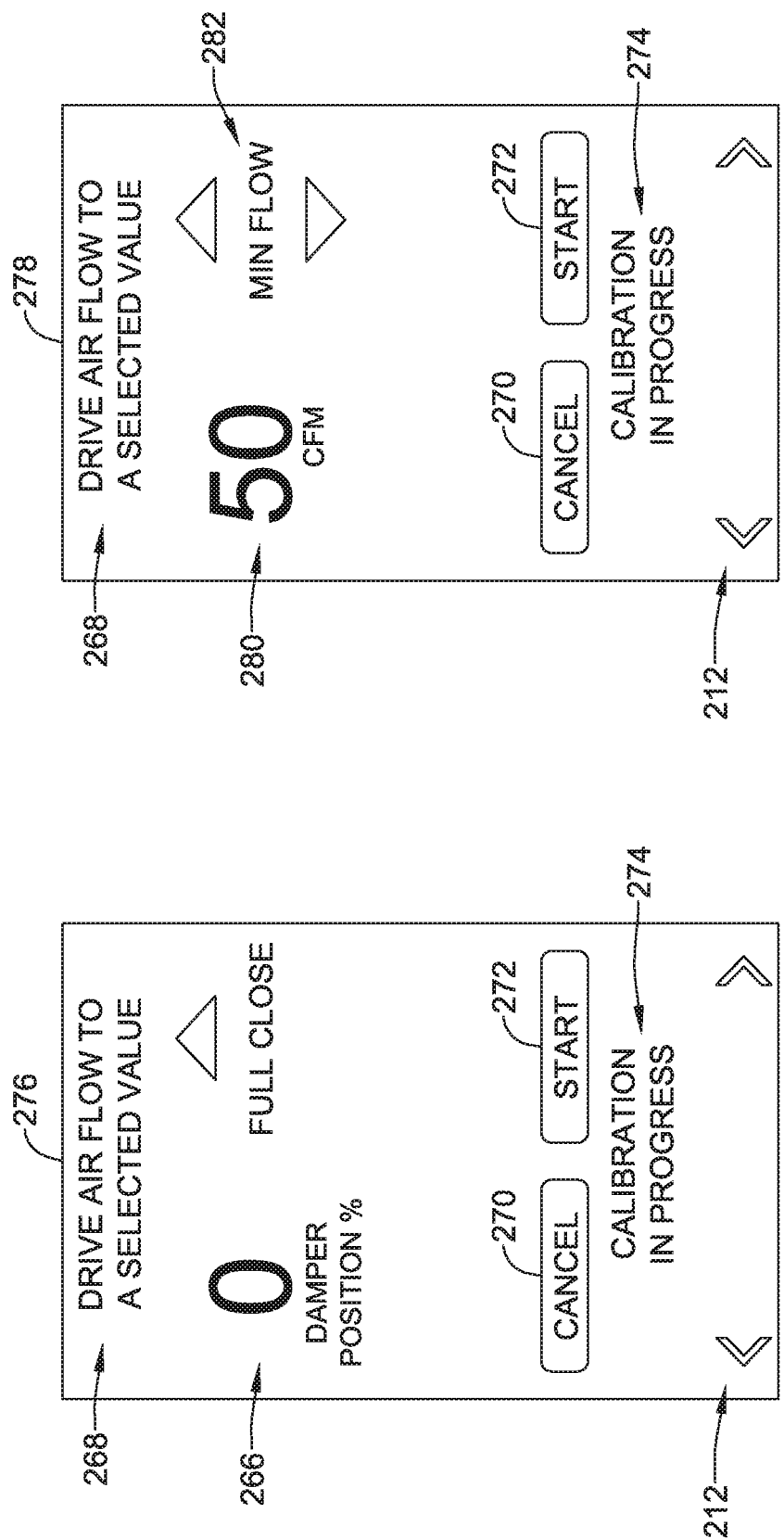

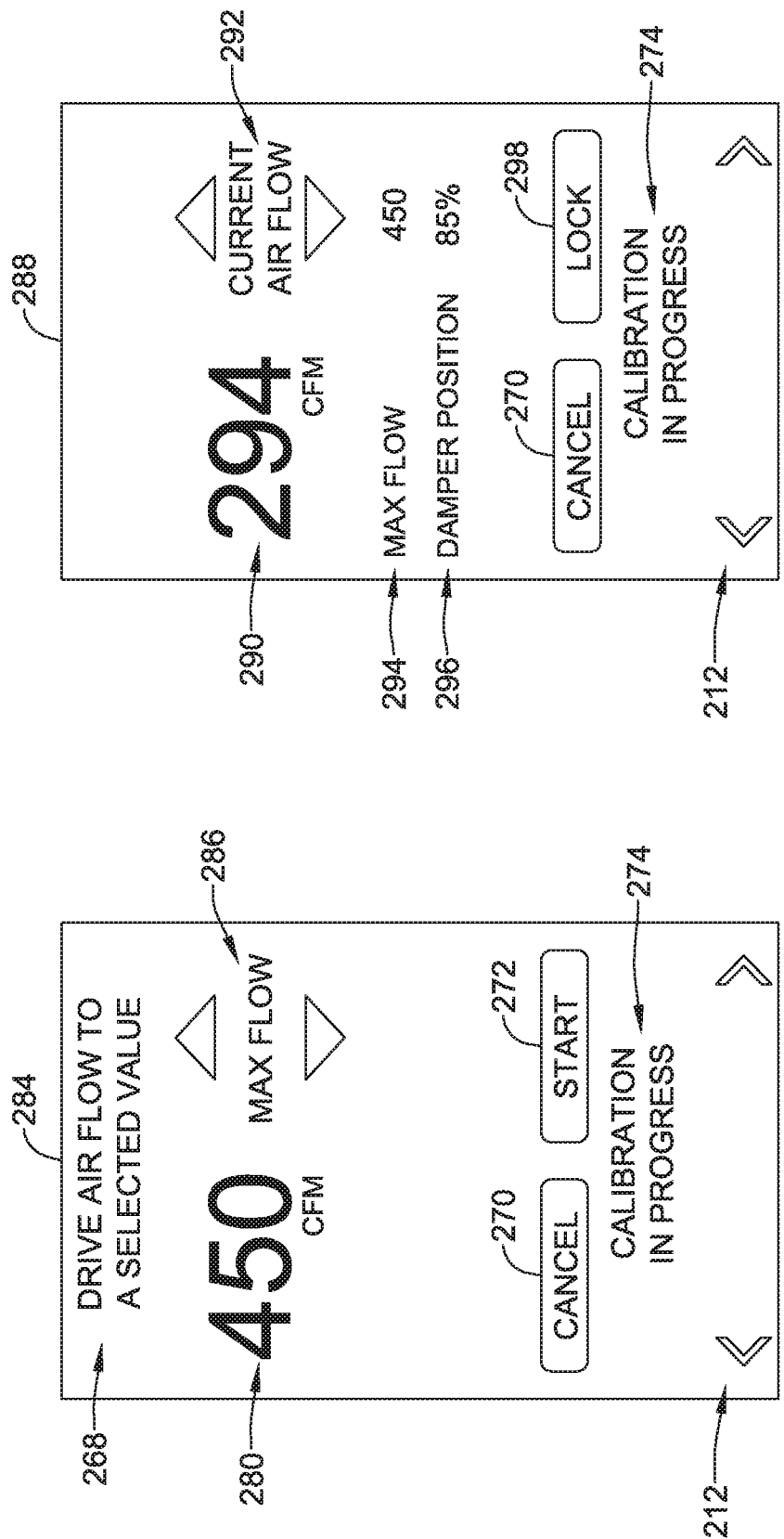

HVAC CONTROLLER FOR A VARIABLE AIR VOLUME (VAV) BOX

This application is a continuation of co-pending U.S. patent application Ser. No. 14/692,711, filed Apr. 21, 2015 and entitled "HVAC CONTROLLER FOR A VARIABLE AIR VOLUME (VAV) BOX", which is incorporated herein by reference.

TECHNICAL FIELD

The disclosure relates generally to HVAC systems and more particularly to HVAC systems that utilize an HVAC controller to control air handling equipment.

BACKGROUND

A variety of HVAC systems include air handling equipment such as VAV (variable air volume) boxes. A VAV box generally includes an air inlet that receives conditioned air and one or more air outlets for distributing the conditioned air to a portion of a building such as a room or zone. A VAV box generally includes a damper that can be driven to multiple positions in order to regulate air flow of through the one or more air outlets. The HVAC system may include one or more HVAC controller that control the operation of the VAV boxes. The HVAC controllers are often wall mountable environmental controllers that sense one or more environmental conditions in a room or zone, and control the dampers of the VAV box(es) to achieve desired environmental conditions in the room or zone. In practice, the VAV boxes must be properly configured during installation and/or reconfigured during maintenance. Configuring the VAV boxes is typically done by manually accessing the VAV boxes, performing certain measurements, and based on those measurements, making certain setting changes on the VAV boxes themselves. This can be a time consuming and tedious task.

SUMMARY

The disclosure pertains to an HVAC Controller for controlling one or more VAV boxes of an HVAC system. The HVAC Controller may be configured to not only control one or more VAV boxes to achieve one or more environmental conditions in a room or zone, but may also be configured to help an installer or other technician configure a VAV box that is operatively connected to the HVAC Controller. In some cases, the HVAC controller may aid an installer or other technician perform a test and balance procedure on a VAV box.

In one example, an HVAC controller may include a temperature sensor that is configured to sense a temperature proximate the HVAC controller and a touch screen user interface that is configured to display the sensed temperature and to enable a user to input a temperature set point. A controller may be operatively coupled to the touch screen user interface and the temperature sensor and may be configured to regulate operation of the VAV box in accordance with the sensed temperature and the temperature set point. The HVAC controller may be programmed with a test and balance procedure that is user-accessible via the touch screen user interface.

The disclosure also pertains to an HVAC system that includes a VAV box including a damper movable between several damper positions and an HVAC controller that is mounted remotely from the VAV box and that includes a touch screen user interface configured to accept a temperature set point. In some cases, the HVAC controller is configured to control the VAV box in accordance with the temperature set point and is also configured to display a user-initiated test and balance procedure on the touch screen user interface.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which:

FIGS. 12 through 18 show illustrative display screens that may be displayed by the illustrative HVAC controller of the HVAC system of FIG. 8; and FIGS. 19 through 31 show illustrative display screens that may be displayed by the illustrative HVAC controller of the HVAC system of FIG. 8.

Figure 1:
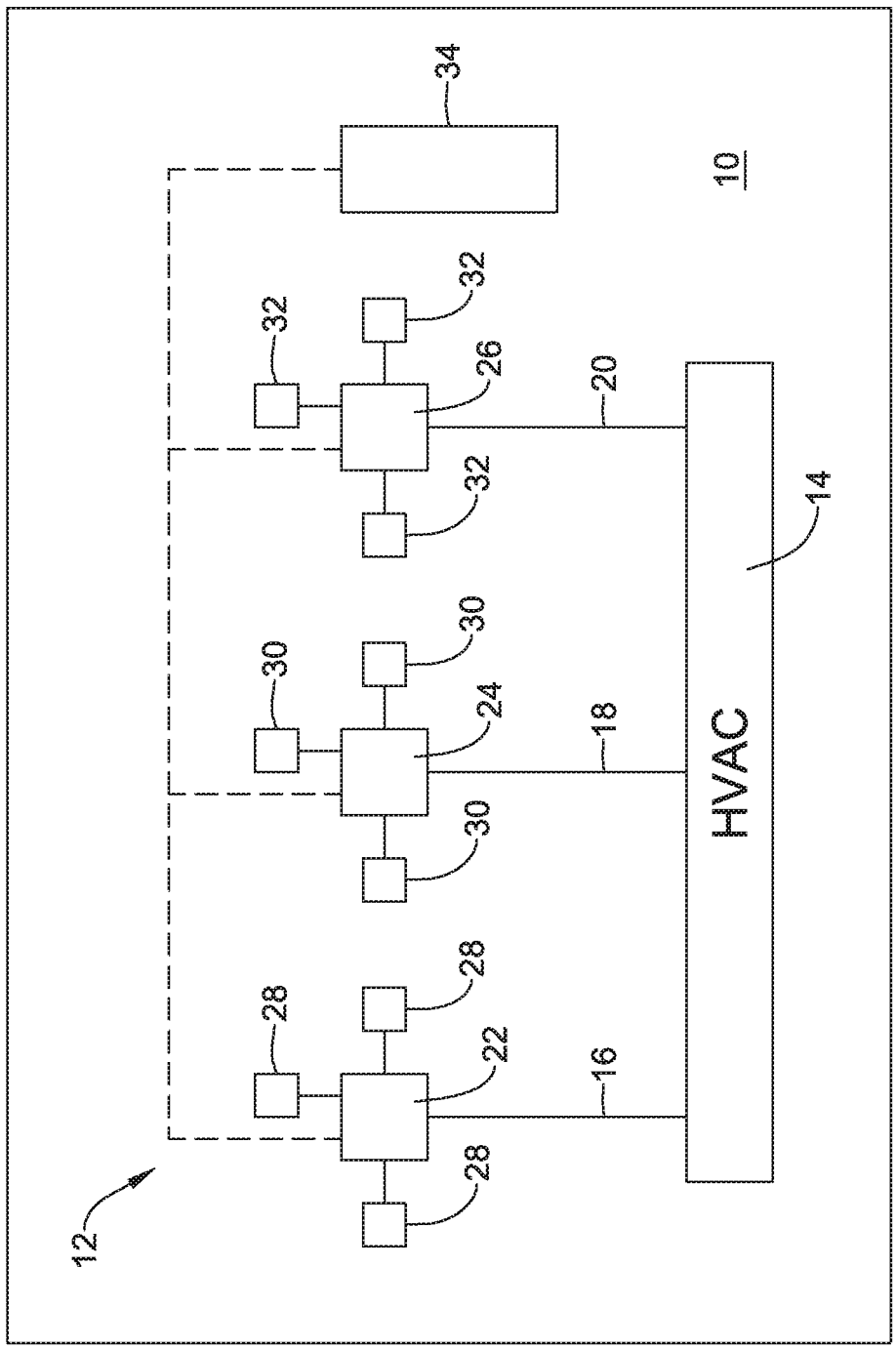
FIG. 1 is a schematic view of an illustrative HVAC system.

While the disclosure is amenable to various modifications and alternative forms, specifics thereof have been shown by way of example in the drawings and will be described in detail. It should be understood, however, that the intention is not to limit the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several examples that are meant to be illustrative of the disclosure. In some embodiments, the disclosure pertains to an HVAC system including a variable volume air controller. An HVAC system may include a VAV box including a damper movable between a first damper position and a second damper position and an HVAC controller that is mounted remotely from the VAV box. In some instances, the HVAC controller may be configured to control the VAV box in accordance with a temperature (or other) set point entered into the HVAC controller. Other set points may include, for example, a humidity set point, a $CO_2$ set point (max $CO_2$ content), an air quality set point, a ventilation set point (e.g. min ventilation), and/or any other suitable set point as desired.

FIG. 1 is a schematic view of a building 10 including an HVAC system 12. In some instances, the building 10 may represent a house and may have a single HVAC system 12 within the building 10. In some cases, the building 10 may represent a larger structure such as an office building, a shopping center, a library, and the like, and the building 10 may include two or more distinct HVAC systems 12, as appropriate given the size and layout of the building 10. In some embodiments, as illustrated, the HVAC system 12 may be a forced air system and may include a conditioned air source 14. The conditioned air source 14 may provide, for example, cooling air, heating air, and/or ventilation air. In some cases, the conditioned air source 14 may provide conditioned air at a constant temperature, and temperature control within the building 10 may be achieved by regulating the relative amounts of conditioned air and outside air, or the relative amounts of conditioned air and recirculated air, that are provided to a room or zone in the building 10.

In the example shown, the conditioned air source 14 is fluidly coupled with a first supply line 16, a second supply line 18 and a third supply line 20. It will be appreciated that this is merely illustrative, as the conditioned air source 14 may be fluidly coupled with just one or two supply lines, or a larger number of supply lines. The first supply line 16 extends to and is fluidly coupled with a first VAV box 22. The second supply line 18 extends to and is fluidly coupled with a second VAV box 24. The third supply line 20 extends to and is fluidly coupled with a third VAV box 26. Again, the number of VAV boxes shown is merely illustrative. Each of the first VAV box 22, the second VAV box 24 and the third VAV box 26 may include a moveable internal damper that can be actuated between a closed position and an open position, and in some cases may be actuatable to any intermediate position between the closed position and the open position. As a result, each VAV box can control how much of the conditioned air received by the VAV box is permitted to continue downstream of the VAV box and into the room or zone of the building.

In some cases, each VAV box may be fluidly coupled to one, two, three or more air vents that distribute any conditioned air that passes through a particular VAV box to a particular room, zone or zones within a building such as building 10. In the example shown in FIG. 1, the first VAV box 22 is fluidly coupled to a total of three air vents 28, the second VAV box 24 is fluidly coupled to a total of three air vents 30, and the third VAV box 26 is fluidly coupled to a total of three air vents 32. It will be appreciated that having three air vents fluidly coupled to each VAV box is merely illustrative. In some embodiments, a particular VAV box will provide conditioned air to a particular space, such as a room, and thus will feed a particular number of air vents as dictated by the spatial arrangement of the space or room.

In some instances, the HVAC system 12 may include an HVAC controller 34 that is operably coupled to the conditioned air source 14, the first VAV box 22, the second VAV box 24 and the third VAV box 26. In some cases, for example, the HVAC controller 34 may monitor an ambient temperature (or other environmental condition such as humidity, $CO_2$ level, air quality, etc.) within the building 10 and may provide instructions to the conditioned air source 14 and/or to one or more of the first VAV box 22, the second VAV box 24 and the third VAV box 26 as appropriate to alter the temperature (or other environmental condition) within the building 10. In some cases, a single HVAC controller 34 may control the entire HVAC system 12 for the entire building 10. In some instances, the HVAC controller 34 may be considered as representing two or more distinct HVAC controllers, each controlling a particular space or zone within the building 10, and optionally in communication with each other.

In some cases, the HVAC controller 34 may be programmed with a temperature set point setback program that enables the building 10 to operate at a more energy efficient temperature at certain times of day and/or particular days, such as when the occupants of the building 10 are away from the building 10, or perhaps are within the building 10 but are sleeping. In some cases, the HVAC controller 34 is not programmable, and merely maintains a desired temperature set point. In some cases, as will be discussed, the HVAC controller 34 may be configured to enable an installer or other professional to test and calibrate the HVAC system 12 upon initial installation and/or periodically as desired.

Figure 2:
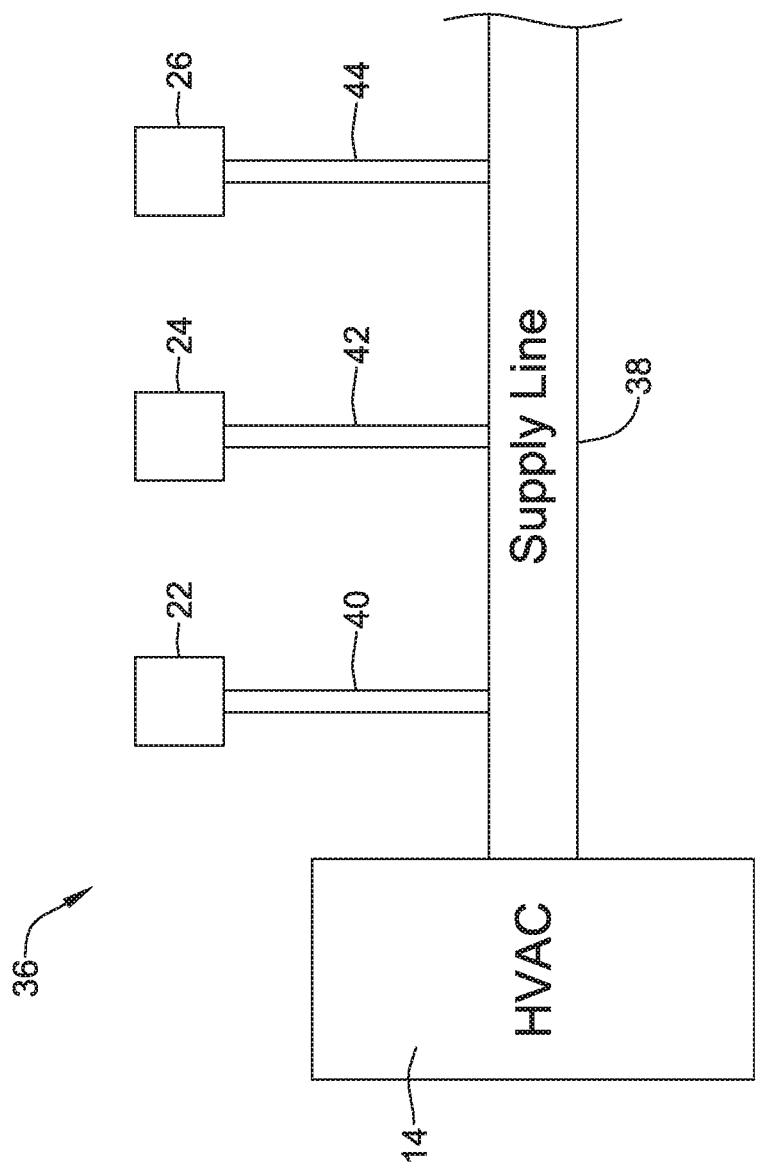
FIG. 2 is a schematic view of an illustrative single deck HVAC system.

In FIG. 1, the HVAC system 12 is schematically illustrated as having supply lines 16, 18 and 20 extending from the conditioned air source 14 to the VAV boxes 22, 24 and 26. In some cases, the HVAC system 12 may be a single deck system in which a single air duct provides conditioned air at a constant or substantially constant temperature to the VAV box to which it is fluidly coupled. In most cases, one or more return ducts (not shown) may return air from the various rooms to the conditioned air source 14. The temperature of the air exiting the VAV box may be controlled to a certain extent by varying the amount of conditioned air exiting the VAV box. In some cases, the VAV box may include a local heat source that can be used to increase the temperature of the air exiting the VAV box. In some cases, the HVAC system 12 may be a dual deck system, in which a first air duct provides conditioned cool air and a second air duct provides conditioned warm air to the VAV box to which the air ducts are fluidly coupled. FIG. 2 provides a schematic illustration of a single deck system while FIG. 3 provides a schematic illustration of a dual deck system.

FIG. 2 shows a portion of an HVAC system 36, including the conditioned air source 14. In this single deck system, the conditioned air source 14 provides conditioned air to a supply main 38. A first air duct 40 is fluidly coupled to the supply main 38 and extends to the first VAV box 22. A second air duct 42 is fluidly coupled to the supply main 38 and extends to the second VAV box 24. A third air duct 44 is fluidly coupled to the supply main 38 and extends to the third VAV box 26. For ease of illustration, no corresponding air vents are shown, although it will be appreciated that each of the VAV boxes 22, 24, 26 may be fluidly coupled to one, two, three or more air vents.

Figure 3:
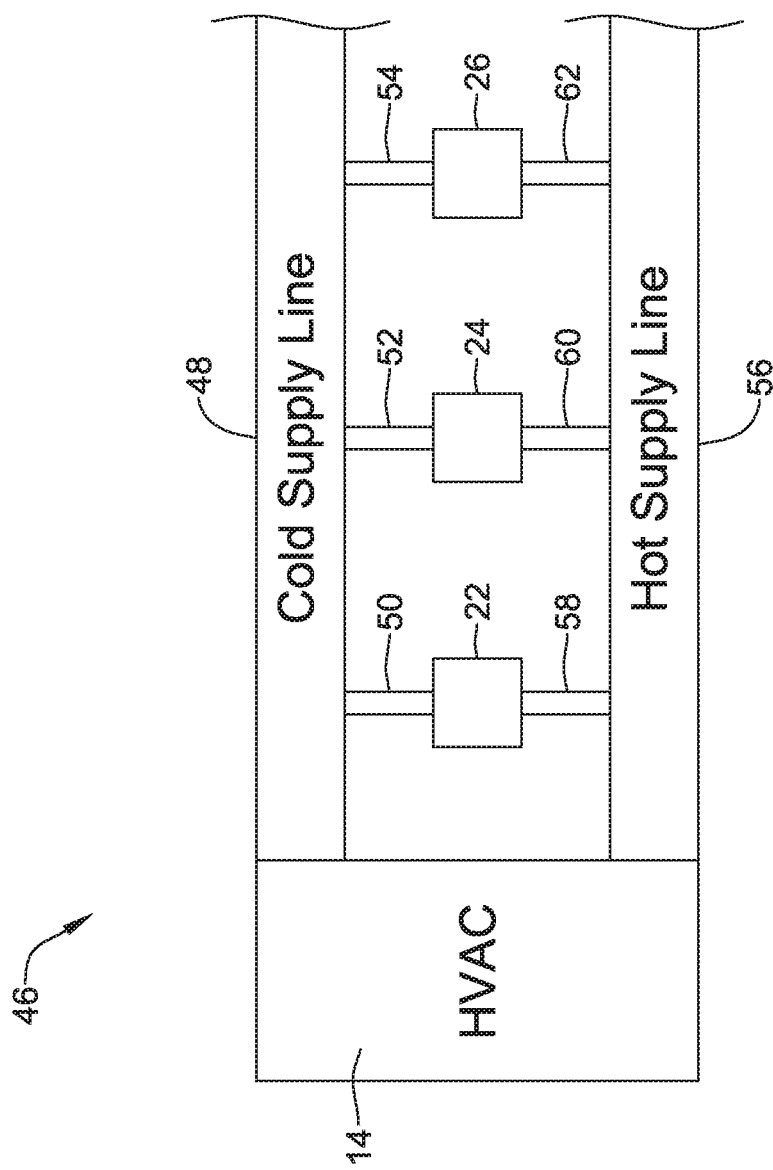
FIG. 3 is a schematic view of an illustrative dual deck HVAC system.

FIG. 3 shows a portion of an HVAC system 46, including the conditioned air source 14. In this dual deck system, the conditioned air source 14 provides cool conditioned air to a cold supply main 48 and provides warm conditioned air to a warm supply main 56. A first air duct 50 is fluidly coupled to the cold supply main 48 and extends to the first VAV box 22. A second air duct 52 is fluidly coupled to the cold supply main 48 and extends to the second VAV box 24. A third air duct 54 is fluidly coupled to the cold supply main 48 and extends to the third VAV box 26. A fourth air duct 58 is fluidly coupled to the warm supply main 56 and extends to the first VAV box 22. A fifth air duct 60 is fluidly coupled to the warm supply main 56 and extends to the second VAV box 24. A sixth air duct 62 is fluidly coupled to the warm supply main 56 and extends to the third VAV box 26. For ease of illustration, no corresponding air vents are shown, although it will be appreciated that each of the VAV boxes 22, 24, 26 may be fluidly coupled to one, two, three or more air vents.

FIGS. 4 through 7 provide further details regarding an illustrative VAV box 64. The illustrative VAV box 64 has a damper 66 that is pivotally secured to a pivot point 68 within a housing 70. While not illustrated, the illustrative VAV box 64 may include an electric motor or hydraulics configured to rotate the damper 66 relative to the pivot point 68. The illustrative VAV box 64 may also include a control box that receives control instructions from a remote thermostat or remote HVAC controller, such as the HVAC controller 34 shown in FIG. 1, and then regulates operation of the electric motor or hydraulics to rotate the damper 66 in order to control the relative amount of air that is permitted to pass through the illustrative VAV box 64. In some cases, the control box may be hard-wired to a remote HVAC controller, such as HVAC controller 34. In some instances, the control box may include a wireless communications module, such as that described in U.S. Ser. No. 14/639,923 filed Mar. 5, 2015 entitled "Wireless Actuator Service", which application is incorporated by reference herein in its entirety, to communicate with a remote HVAC controller, such as HVAC controller 34. While a single rotating damper is shown in FIGS. 4-7, it is contemplated that the VAV box 64 may include any suitable damper mechanism, including multiple rotatable dampers, one or more longitudinally sliding dampers, one or more inflatable bladder(s), etc.

Figure 5:
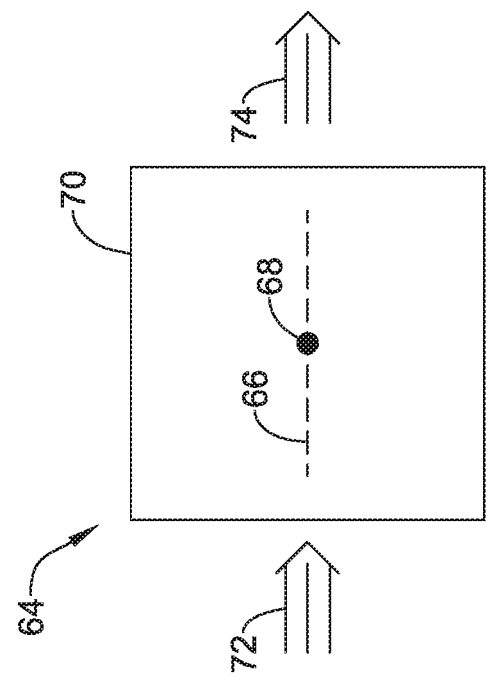
FIG. 5 is a schematic view of an illustrative VAV box shown with its damper in a fully open position.
Figure 4:
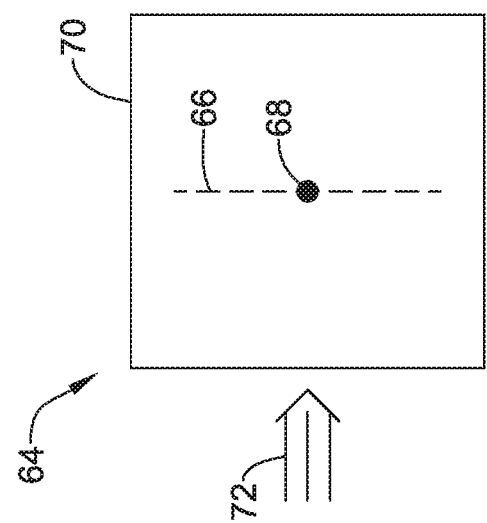
FIG. 4 is a schematic view of an illustrative VAV box shown with its damper in a fully closed position.
Figure 6:
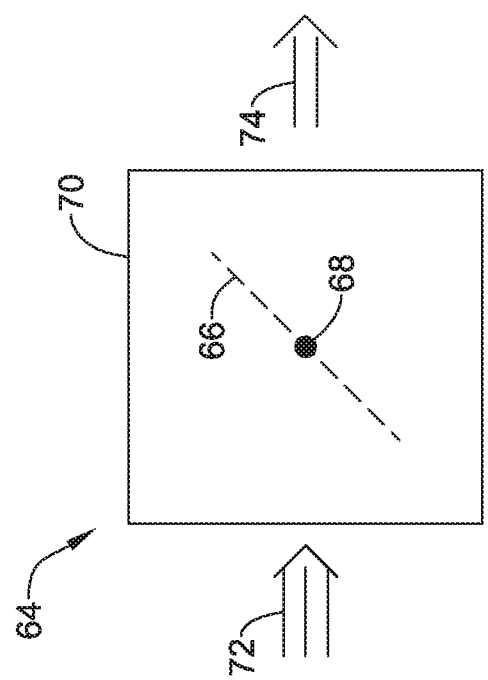
FIG. 6 is a schematic view of an illustrative VAV box shown with its damper in a partially open position.

In FIGS. 4-6, air flow entering the VAV box 64 is represented by an arrow 72. In FIG. 4, the damper 66 is shown in its fully closed position, as indicated by essentially no air exiting the VAV box 64. In some cases, there may be some air exiting the VAV box 64, even with the damper 66 in its fully closed position. This may be intentional, such as to meet certain minimum ventilation requirements. In FIG. 5, the damper 66 is shown in its fully open position, as the air exiting the VAV box 64 is represented by an arrow 74 that is roughly the same size as the arrow 72 representing incoming air. In FIG. 6, the damper 66 is shown in an intermediate position, as the air exiting the VAV box 64 is represented by an arrow 76 that is smaller than the arrow 72 representing incoming air.

Figure 7:
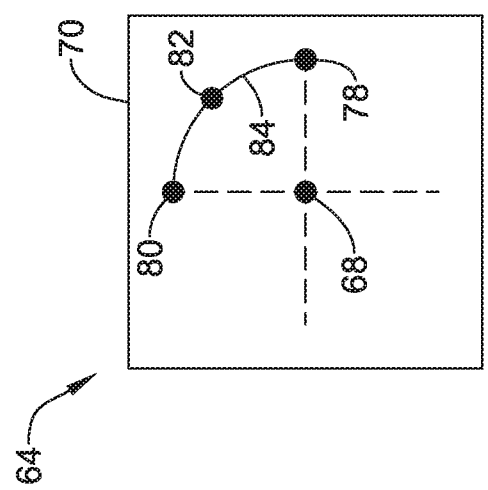
FIG. 7 is a schematic view of an illustrative VAV box illustrating relative damper positions.

FIG. 7 provides a schematic illustration of the various possible damper positions. A fully open position is indicated at a point 78. A fully closed position is indicated at a point 80. An intermediate position is indicated at a point 82. It will be appreciated that the intermediate point 82 may be located at any desired position along curve 84, between the fully open point 78 and the fully closed point 80.

Figure 8:
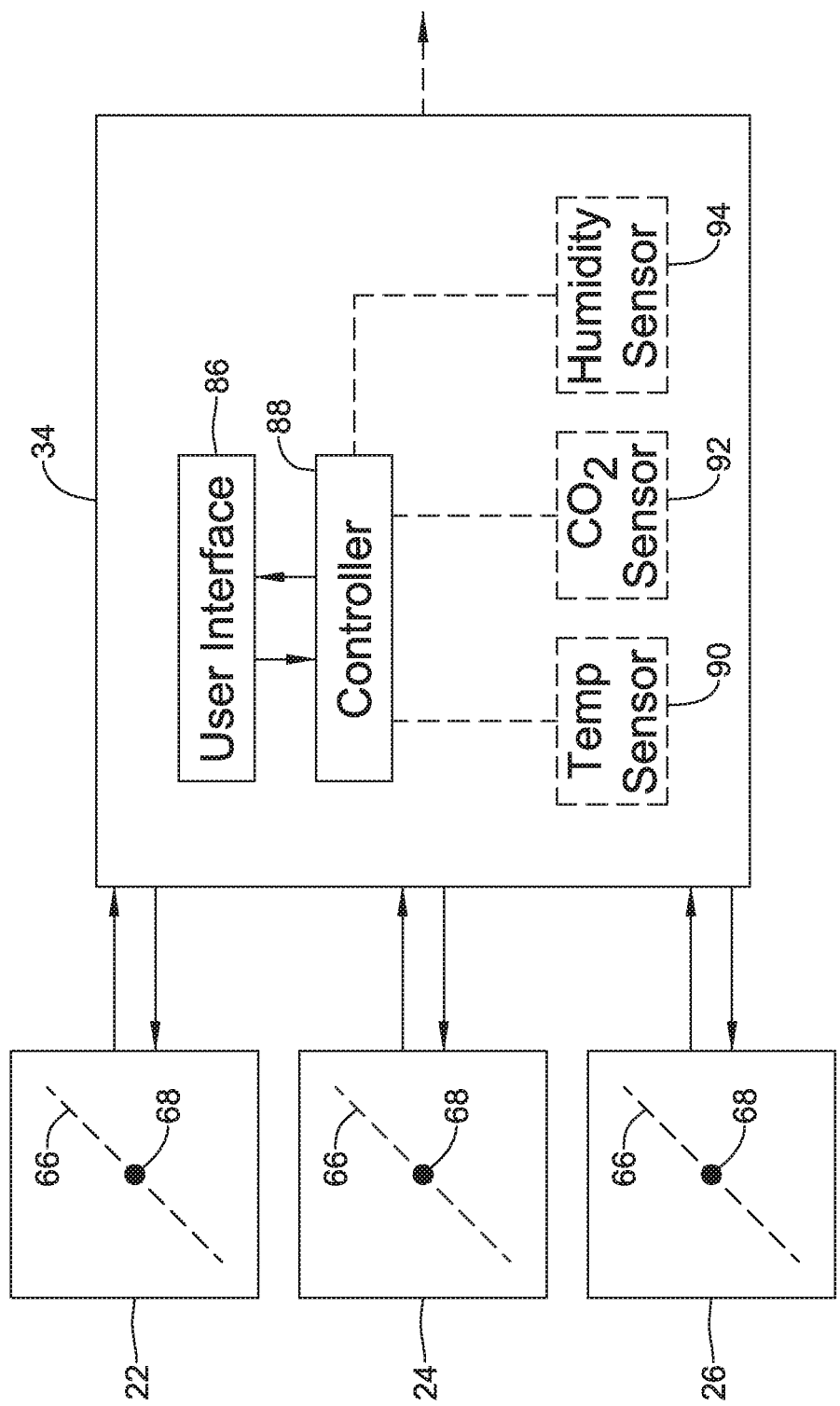
FIG. 8 is a schematic view of an illustrative HVAC system.

FIG. 8 provides further details regarding the illustrative HVAC controller 34 (FIG. 1). The illustrative HVAC controller 34 is illustrated in FIG. 8 as being in operative communication with the first VAV box 22, the second VAV box 24 and the third VAV box 26.

It will be appreciated that while three VAV boxes are shown, the system may include any desired number of VAV boxes. Communication between the illustrative HVAC controller 34 and the VAV boxes 22, 24 and 26 may be wired or wireless communication, and may utilize any desired wired or wireless communications protocol as desired. Illustrative but non-limiting examples of wireless communications protocols include one or more short nominal range wireless communication protocols such as Bluetooth, ZigBee, Ultra-Wideband (UWB), Dedicated Short Range Communication (DSRC), Infrared Data Association (IrDA), EnOcean, REDLINK™, Near field Communication (NFC), RFID, and/or any other suitable common or proprietary wireless protocol, as desired. In some embodiments, BLE (Bluetooth Low Energy) may be employed.

In some instances, the illustrative HVAC controller 34 may be configured to control the VAV boxes 22, 24 and 26 in accordance with a temperature set point entered into the HVAC controller 34. As noted, the illustrative HVAC controller 34 may regulate the air temperature, at least in part, by controlling the position of the damper 66 (FIGS. 4-6). In some cases, the illustrative HVAC controller 34 may be configured to instruct the VAV box 22, 24, 26 to drive the damper 66 from a first damper position, which could for example be the fully open point 78 shown in FIG. 7 to a second damper position, which could for example be the fully closed point 80 shown in FIG. 7. The first damper position could instead be the fully closed point 80, or the intermediate point 82. The second damper position could be the fully open point 78, or the intermediate point 82.

The illustrative HVAC controller 34 further includes a user interface 86 and a controller 88 that is operably coupled to the user interface 86. In some cases, the user interface 86 is a touch screen user interface, but this is not required. In some instances, the illustrative HVAC controller 34 may include one or more of a temperature sensor 90, a carbon dioxide sensor 92 and a humidity sensor 94, but these are not required in all cases. In some cases, the temperature sensor 90 is configured to sense a temperature proximate the HVAC control 34 and communicate the sensed temperature to the controller 88. The controller 88 may be configured to solicit a desired temperature set point from a user via the user interface 86 and may regulate operation of the VAV boxes 22, 24 and 26 in accordance with the sensed temperature and the temperature set point.

In some embodiments, the illustrative HVAC controller 34 may also be configured to facilitate a test and balance procedure. In some cases, the illustrative HVAC controller 34 may be configured to initiate a test and balance procedure in response to a user input received via the user interface 86. This may be done, for example, when initially setting up a new HVAC system in a new building. In some cases, there may be a desire to initiate a test and balance procedure after a remodeling project when physical changes have been made to the layout of the HVAC system. In some instances, the HVAC controller 34 may be configured to initiate a test and balance procedure in response to a calendar reminder that is programmed into the HVAC controller 34. For example, an installer may instruct the HVAC controller 34 to initiate a test and balance procedure once a year for routine maintenance.

A test and balance procedure may permit an installer, for example, to determine actual air flow for a particular VAV box at various damper positions. While a particular VAV box may have design characteristics, such as intended air flow characteristics at particular damper positions, in some cases once installed the actual air flow characteristics may vary from design standards. During a test and balance procedure, an installer can instruct via the HVAC controller 34 a damper in a VAV box to move to a particular damper position, and then resulting air flow may be measured either manually by the installer or automatically if the VAV box has an appropriate flow sensor. Accordingly, determinations may be made regarding appropriate damper positions for various desired air flow values, and the VAV box may be so calibrated. It will be appreciated that air flow is determined in order to achieve desired temperature, humidity and/or other environmental conditions in the space.

In some cases, a test and balance procedure may include instructing a particular damper to drive to a first damper position to obtaining a measure of air flow with the damper at the first damper position. The test and balance procedure may also include instructing the damper to drive to a second damper position to obtaining a measure of air flow with the damper at the second damper position. In some instances, the first damper position represents a minimum damper open position and the second damper position represents a maximum damper open position, although this is not required in all cases. In some cases, the test and balance procedure may include instructing a damper to drive to a plurality of different intermediate damper positions, and obtaining air flow measurements for each of those damper positions. In some cases, a damper is driven to a particular position, and the damper is held at that position. An indication of airflow may be obtained (either manually by the installer or automatically via the VAV box if so equipped), and the damper may be released from the particular position. It will be appreciated that in some cases, dampers may be biased to a particular position such as a fully open position. In some cases, other parameters such as humidity and/or carbon dioxide concentration may also be measured.

In some embodiments, the test and balance procedure may include sequentially driving the damper to each of a plurality of predetermined positions. Each of the predetermined positions may be displayed on the touch screen user interface. An indication of air flow through the VAV box may be obtained. The indication of air flow through the VAV box may be displayed on the touch screen user interface.

Figure 9:
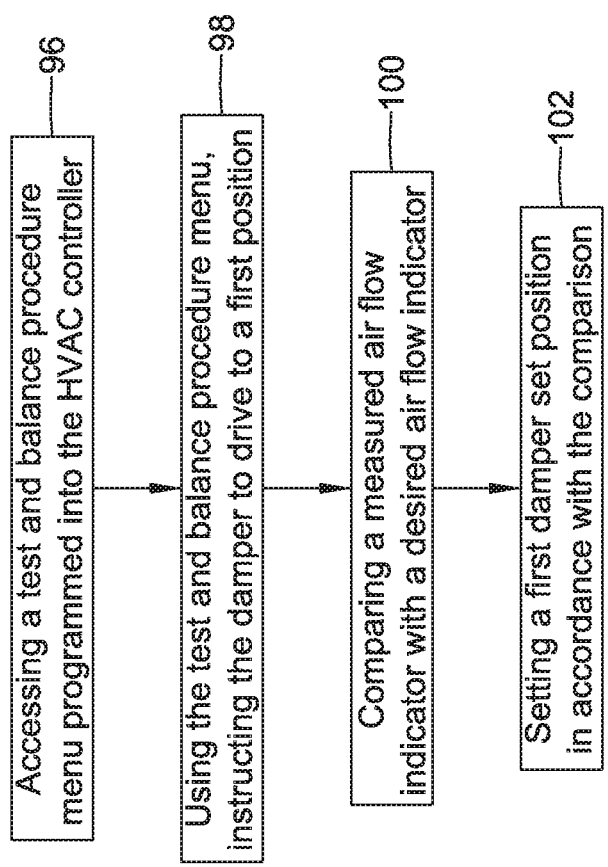
FIG. 9 is a flow diagram showing an illustrative method that may be carried out via the HVAC system of FIG. 8.

FIG. 9 is a flow diagram showing an illustrative method that may be carried out using the HVAC controller 34. A test and balance procedure may be performed on a VAV box that includes a damper. A test and balance procedure menu programmed into the HVAC controller 34 may be accessed, as generally indicated at block 96. In some cases, the test and balance menu may be accessed via the user interface 86 (FIG. 8) of the HVAC controller 34, which is optionally a touch screen user interface. In some instances, the test and balance menu may be an intuitive, user-friendly menu. Using the test and balance menu, and as seen at block 98, the damper of the VAV box is instructed to drive to a first position. A measured air flow indicator may be compared with a desired air flow indicator, as generally seen at block 100. In some cases, an air flow indicator may be an air velocity value or a volumetric air flow value. As seen at block 102, a first damper set position may be set in accordance with the comparison.

In some cases, the measured air flow indicator is compared with a desired air flow indicator by the installer. When so provided, the installer may titrates by adjusting the damper position using the user interface 86 of the HVAC controller 34 until the desired air flow is achieved, and then sets the first damper set accordingly. In other cases, the air flow is measured by the installer and a measured air flow indicator is entered into the HVAC controller 34 via the user interface 86, or a measured air flow indicator is communicated to the HVAC controller 34 from the VAV box if the VAV box is so equipped, and the HVAC controller 34 compares the measured air flow indicator with a desired air flow indicator that is stored in a memory of the HVAC controller 34. In some cases, the HVAC controller 34 may then titrate by adjusting the damper position based on the comparison, as desired.

Figure 10:
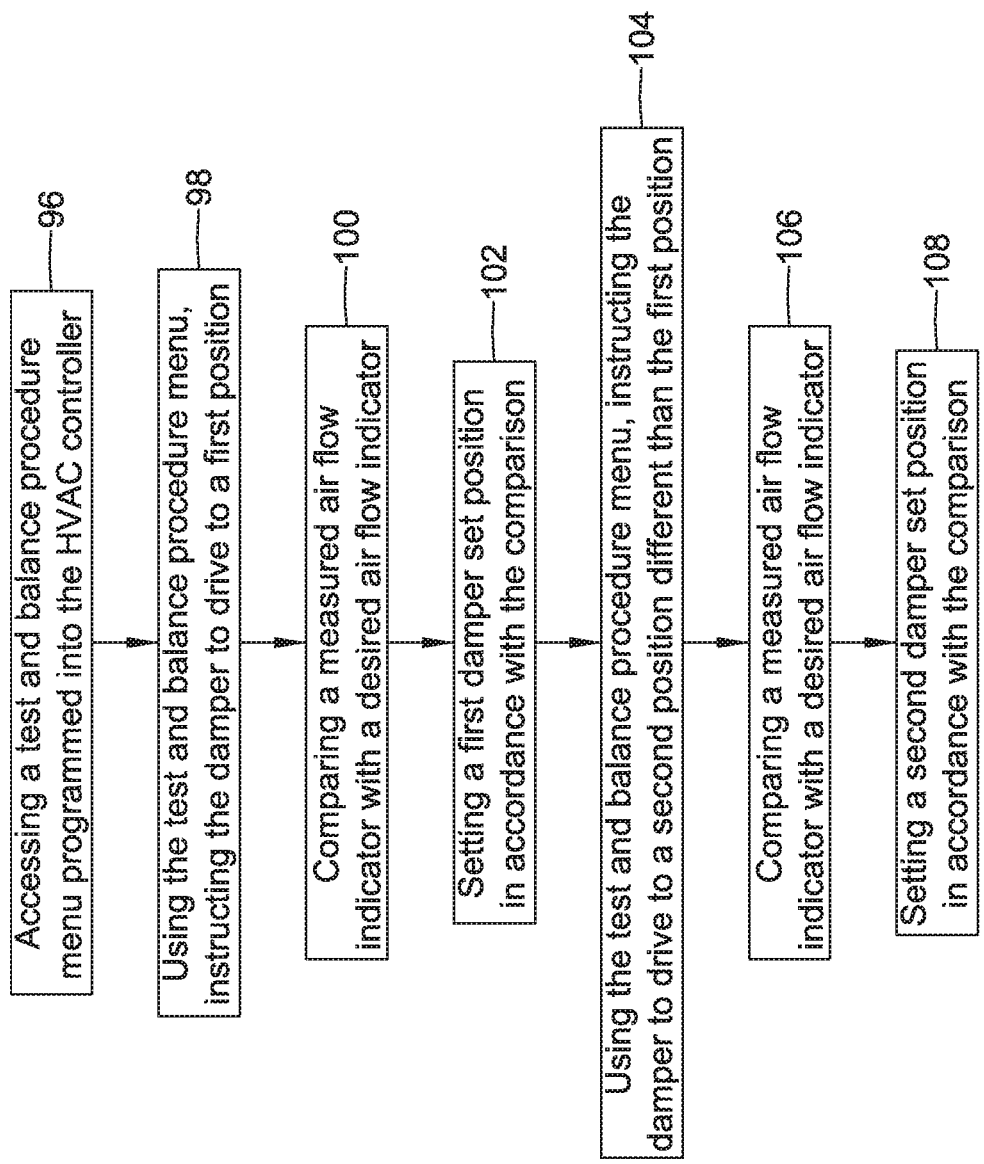
FIG. 10 is a flow diagram showing an illustrative method that may be carried out via the HVAC system of FIG. 8.

FIG. 10 shows a flow diagram of another illustrative method that may be carried out using the HVAC controller 34. A test and balance procedure menu programmed into the HVAC controller 34 may be accessed, as generally indicated at block 96. In some cases, the test and balance menu may be accessed via the user interface 86 (FIG. 8) of the HVAC controller 34. Using the test and balance menu, and as seen at block 98, the damper of a VAV box is instructed to drive to a first position. A measured air flow indicator may be compared with a desired air flow indicator, as generally seen at block 100. As seen at block 102, a first damper set position may be set in accordance with the comparison. Using the test and balance menu, the damper of the VAV box may be instructed to drive to a second position that is different from the first position, as seen at block 104. A measured air flow indicator may be compared with a desired air flow indicator, as seen at block 106. A second damper set position may be set in accordance with the comparison, as generally indicated at block 108. It will be appreciated that these steps may be carried out for any desired number of damper positions, and for any number of VAV boxes as desired.

Figure 11:
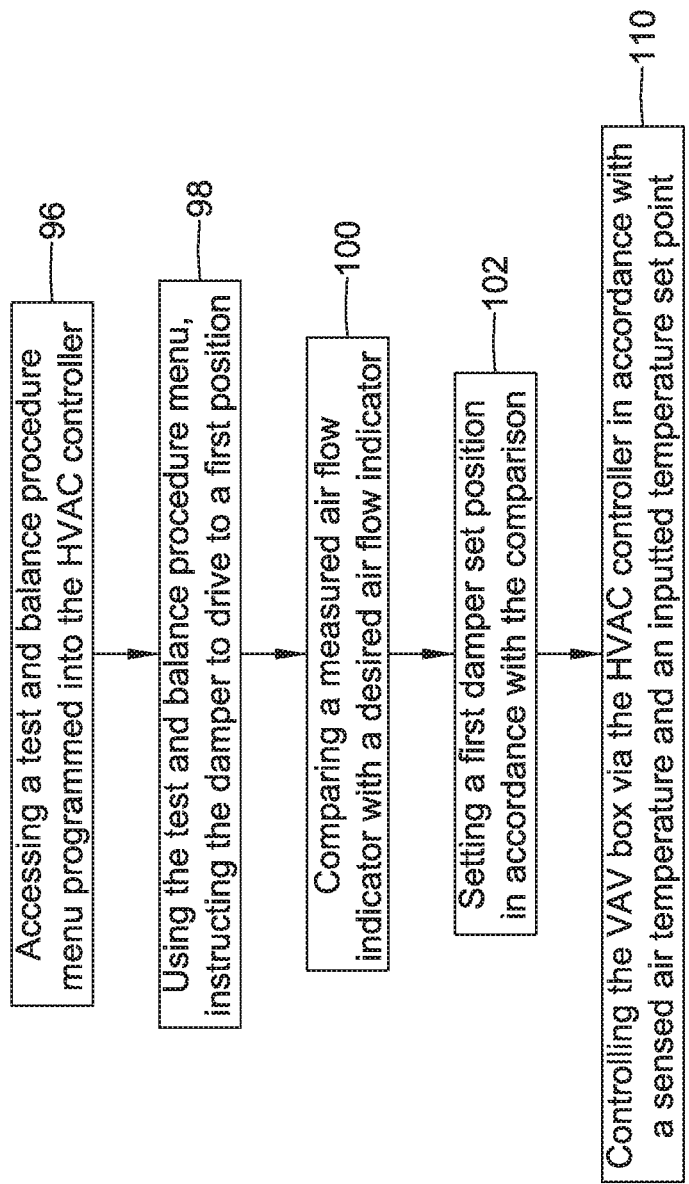
FIG. 11 is a flow diagram showing an illustrative method that may be carried out via the HVAC system of FIG. 8.

FIG. 11 shows a flow diagram of another illustrative method that may be carried out using the HVAC controller 34. A test and balance procedure menu programmed into the HVAC controller 34 may be accessed, as generally indicated at block 96. In some cases, the test and balance menu may be accessed via the user interface 86 (FIG. 8) of the HVAC controller 34. Using the test and balance menu, and as seen at block 98, the damper is instructed to drive to a first position. A measured air flow indicator may be compared with a desired air flow indicator, as generally seen at block 100. In some cases, an air flow indicator may be an air velocity value or a volumetric air flow value, for example. As seen at block 102, a first damper set position may be set in accordance with the comparison. In some cases, and as generally indicated at block 110, the HVAC controller 34 may control the VAV box in accordance with a sensed air temperature and an inputted temperature set point.

The HVAC controller 34 may display a variety of different screens, including a number of different environmental parameters. In some instances, as will be shown, the displayed environmental parameters, when displayed, may be displayed in repeatable locations. For example, a current temperature value may always be displayed in a particular location on the screen. A temperature set point, if displayed, may always be displayed in a particular location on the screen. A sensed humidity value, if displayed, may always be displayed in a particular location on the screen. A sensed carbon dioxide value, if displayed, may always be displayed in a particular location on the screen. A graphical icon indicating mode, such as normal operation mode, temperature set point adjustment mode or commissioning mode in which a test and balance procedure is operated may, if displayed, always be displayed in a particular location on the screen. Any variety of graphical icons may be displayed, including but not limited to a clock icon, a thermometer icon, a fan blade icon, a relative humidity icon, a heating icon and/or a cooling icon.

Figure 12:
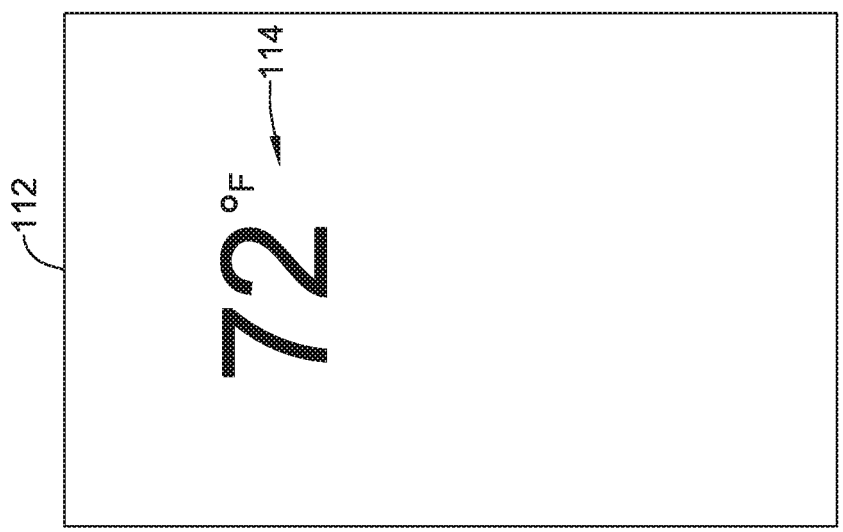

In one example, when the HVAC controller 34 is in a test and balance mode, the HVAC controller 34 may be configured to display a damper time value and up and down arrows for adjusting the damper time value. The damper time value may represent the time it takes to move from a fully open position to a fully closed position, or visa-versa. In some cases, the HVAC controller 34 may be configured to display an air flow volume value and up and down arrows for adjusting the air flow volume value. The air flow volume value may be the desired air flow indicator discussed above. FIGS. 12 through 18 provide illustrative but non-limiting examples of screen that may be displayable by the HVAC controller 34. FIG. 12 shows a screen 112 illustrating a clean, un-cluttered "across the room view" in which a current sensed temperature 114 is displayed in a relatively large size font on an otherwise blank screen. As a result, the current sensed temperature 114 is easy to read. FIG. 12 may be considered as an example of the HVAC controller 34 being in its normal operation mode.

FIGS. 13 through 18 show screens that may be displayed while configuring the HVAC controller 34. FIGS. 13 through 18 show a variety of graphical icons. A user may select one of the graphical icons to check or alter a setting for a particular parameter. As illustrated, the graphical icons include a clock icon 118 that may be selected for setting a time, for example. A thermometer icon 120 may be selected for checking or changing a temperature set point. A fan icon 122 may be selected for checking or changing a setting related to fan speed, or whether the fan runs all the time, or automatically with the rest of the HVAC equipment. A raindrop icon 124 may be selected for checking or changing humidity setpoint values. A $CO_2$ icon 126 may be selected for checking or changing permitted carbon dioxide values, or carbon dioxide alarm values. A blinds icon 128 may be selected for checking or changing window blind positions. A light bulb icon 130 may be selected for changing lighting settings. A house icon 132 may be selected to return to a home screen.

Figure 13:
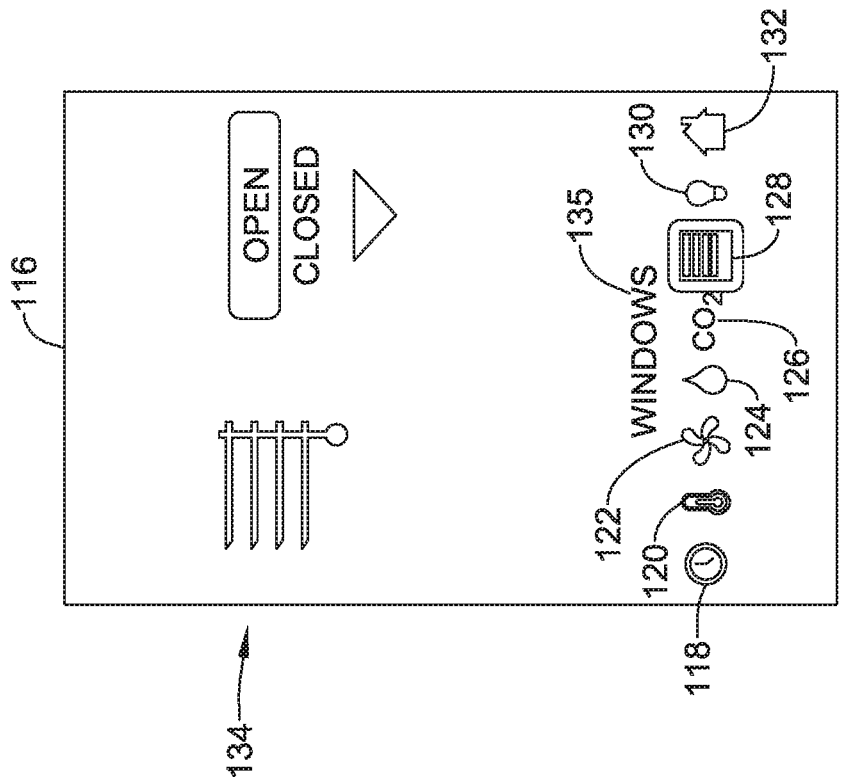

FIG. 13 shows a screen 116 in which it can be seen that a user has selected the blinds icon 128, as the blinds icon 128 is highlighted. The screen 116 includes a blinds display 134, and the blinds are open. In FIG. 14, the blinds can be seen to be closed, as indicated by the blinds display 134 on a screen 136. It can be seen that the blinds display 134 is shown in the same location in both FIGS. 13 and 14. Screens 116 and 136 also displays a Windows text 135 that helps to provide context.

FIGS. 15 and 16 show example screens in which the $CO_2$ icon 126 has been selected as indicated by the $CO_2$ icon 126 being highlighted. FIG. 15 provides a screen 138 that includes a $CO_2$ display 140 that is displayed using 3 digits while FIG. 16 provides a screen 142 that includes a $CO_2$ display 140 displayed using 4 digits. It can be seen that the $CO_2$ display 140 is displayed in the same location in both FIGS. 15 and 16. Screens 138 and 142 also include an Air Quality icon 141 that helps to provide context. FIG. 17 provides a screen 144 in which the humidity icon 124 has been selected and is highlighted. The screen 144 includes a first humidity display 146 and a second humidity display 148. The screen 144 also includes a humidity text 150 that helps to provide context.

FIG. 18 shows a screen 150 that may be displayed when a user selects the thermometer icon 120, which is shown as illuminated or otherwise selected. This screen may be used, for example, to change a temperature set point. The screen 150 includes a temperature set point display 152 that displays a current temperature set point and an up arrow and down arrow display 154 that may be used by the user to raise or lower the temperature set point. The screen 150 also includes a range display 156 as well as a Temperature text that helps to provide context.

FIG. 19 shows another screen 200 that may be displayed on the user interface 86 (FIG. 8) of the HVAC controller 34. The screen 200 displays at least part of a service mode menu and includes a field service button 202, a settings button 204, an exit button 206, a custom codes button 208 and a balance button 210. A text 214 indicates that the screen 200 is part of the service mode menu. Buttons 212 permit an individual to scroll forwards and backwards among multiple screens, such as the screen 200, which are displayable by the HVAC controller 34. Selecting the balance button 210 may cause the HVAC controller 34 to display additional screens useful in performing a test and balance procedure on one or more VAV boxes. It will be appreciated that in addition to testing damper position and corresponding airflow, as discussed with respect to previous Figures, a test and balance procedure may be used to calibrating various HVAC system components including the VAV boxes in order to achieve desired HVAC system performance, control air pressure within a building (not excessively over-pressurizing or under-pressurizing the building), and/or to control the flow of conditioned air from a conditioned air source in order to not overly stress the HVAC system.

Figure 20:
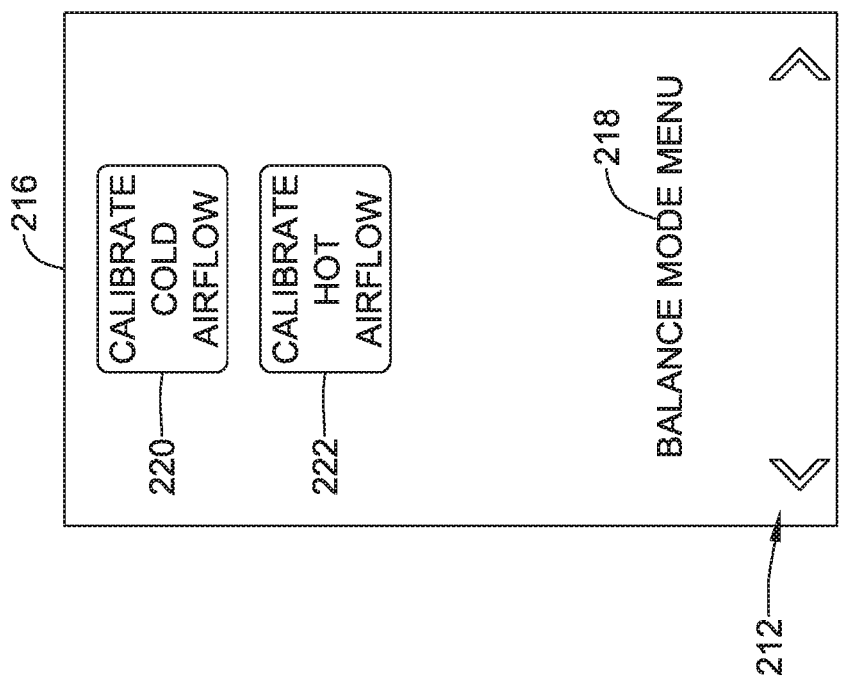

When the balance button 21 of FIG. 19 is selected, the HVAC controller 34 may enter the balance mode and may display a screen 216, as shown in FIG. 20. The screen 216 includes a text message 218 indicating that it is in the balance mode. A cold deck button 220 and a hot deck button 222 permit a user to select whether they wish to calibrate the cold deck or the hot deck. This assumes, of course, that the HVAC system in question has both a cold deck and a hot deck. A dual deck system is shown schematically in FIG. 3 while a single deck system is shown schematically in FIG. 2. If the HVAC system in question is a single deck system, the screen 216 would not include a hot deck button 222, and perhaps the cold deck button 220 would be labeled differently. Once the user makes a selection, the HVAC controller 34 will display the next screen in the test and balance process, such as the screen 224 shown in FIG. 21.

Figure 21:
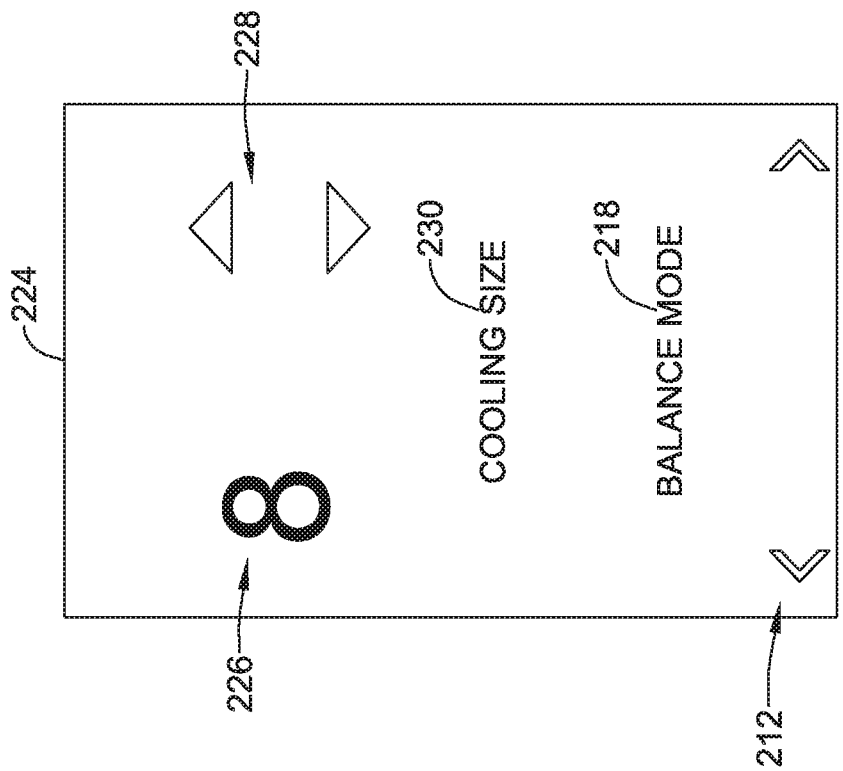

FIGS. 21 through 25 show illustrative but non-limiting screens that may be displayed by the HVAC controller 34 when calibrating a cold deck. Similar screens may be displayed when calibrating a hot deck. It will be appreciated that these screens may be accessed in any order, and that some illustrated screens may be omitted in certain installations. It will also be appreciated that the calibration process may include additional screens that are not illustrated. FIG. 21 shows a screen 224 that permits a user to indicate the size of the cooling apparatus associated with the HVAC system 12. In some cases, cooling capacity is stated in tons. The screen 224 includes a cooling size value 226 as well as a set 228 of adjusting arrows that may be used to raise or lower the cooling size value 226. The screen 224 also includes text 230 to help provide context. Once the cooling size has been set as appropriate, the user may use buttons 212 to advance to the next screen.

Figure 22:
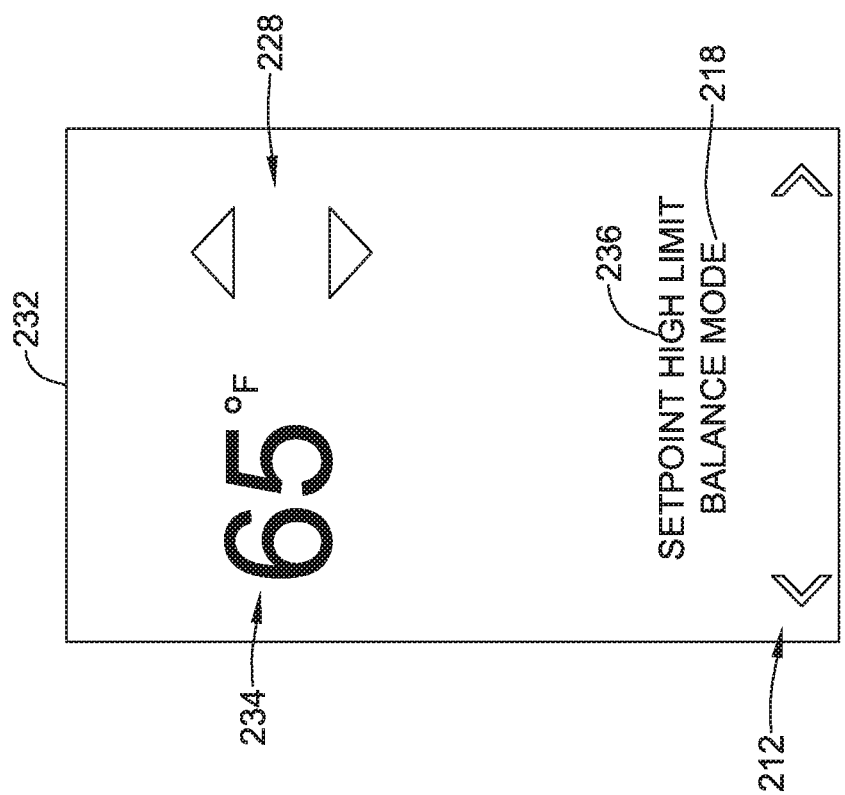

FIG. 22 shows a screen 232 that permits a user to adjust a high limit for the cooling temperature. The screen 232 includes a high limit value 234 as well as a set 228 of adjusting arrows that may be used to raise or lower the high limit value 234. The screen 232 includes text 236 to help provide context. Once the high limit value has been set as appropriate, the user may use buttons 212 to advance to the next screen.

Figure 23:
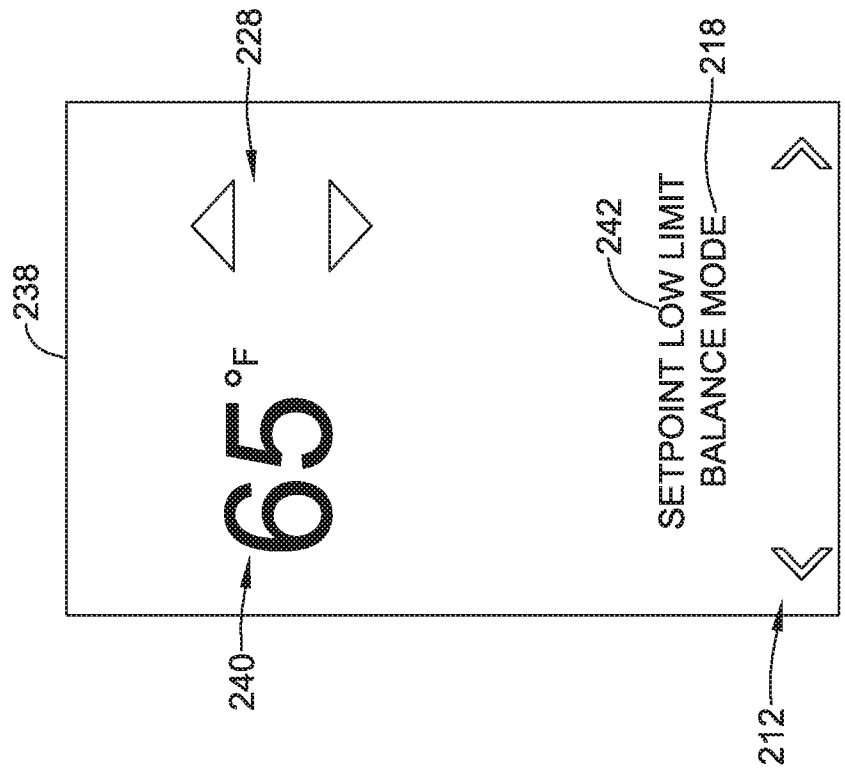

FIG. 23 shows a screen 238 that permits a user to adjust a low limit for the cooling temperature. The screen 238 includes a low limit value 240 as well as a set 228 of adjusting arrows that may be used to raise or lower the low limit value 240. The screen 238 includes text 242 to help provide context. Once the low limit value has been set as appropriate, the user may use buttons 212 to advance to the next screen.

Figure 24:
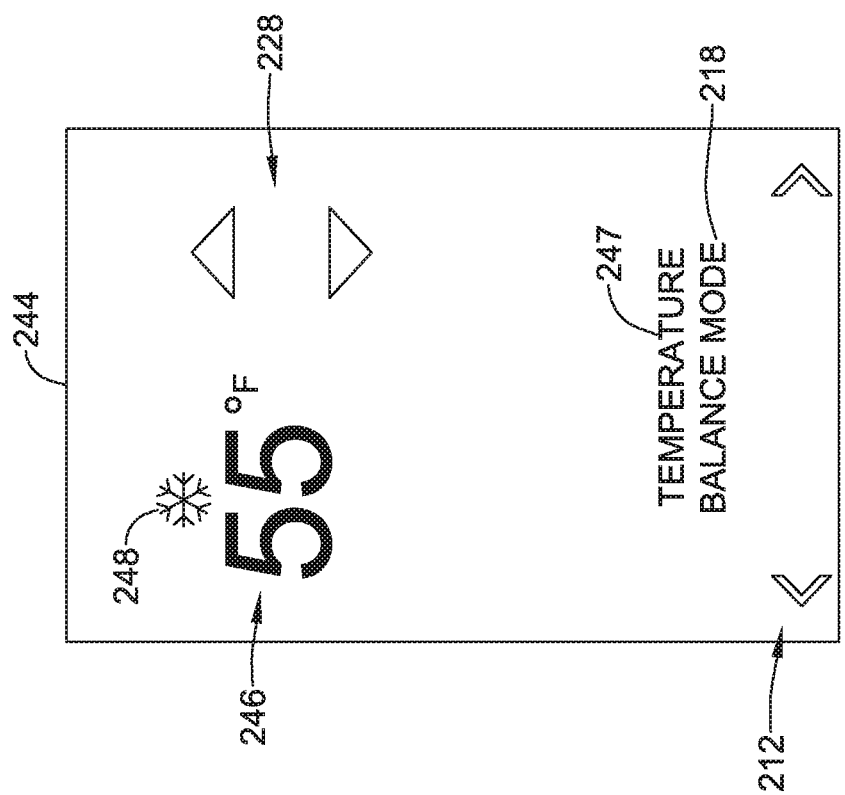

FIG. 24 shows a screen 244 that permits a user to adjust a temperature set point for use in the test and balance procedure. The screen 244 includes a temperature set point 246 and a cooling icon 248 as well as a set 228 of adjusting arrows that may be used to raise or lower the temperature set point 246. The screen 244 includes text 247 to help provide context. Once the temperature set point has been set as appropriate, the user may use buttons 212 to advance to the next screen.

Figure 25:
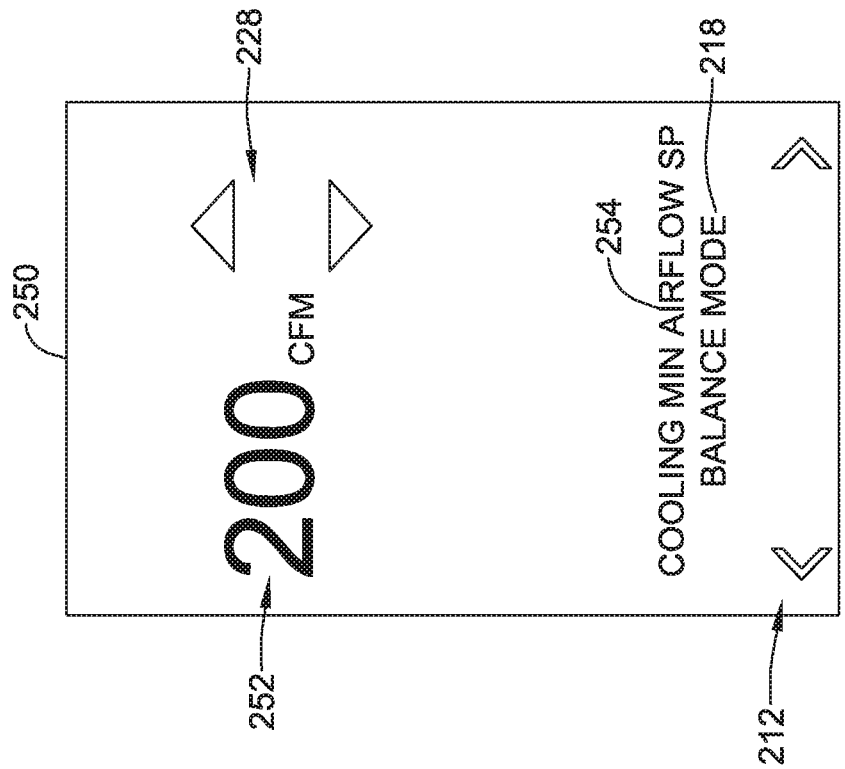

FIG. 25 shows a screen 250 that permits a user to adjust a minimum airflow value. The screen 250 includes a minimum airflow value 252 as well as a set 228 of adjusting arrows that may be used to raise or lower the minimum airflow value 252. The screen 250 includes text 254 to help provide context. Once the minimum airflow value has been set as appropriate, the user may use buttons 212 to advance to the next screen.

FIGS. 26 through 31 show additional illustrative but non-limiting screens that may be displayed by the HVAC controller 34 when calibrating a cold deck. Similar screens may be displayed when calibrating a hot deck. It will be appreciated that these screens may be accessed in any order, and that some illustrated screens may be omitted in certain installations. It will also be appreciated that the calibration process may include additional screens that are not illustrated.

Figures 26, 27:
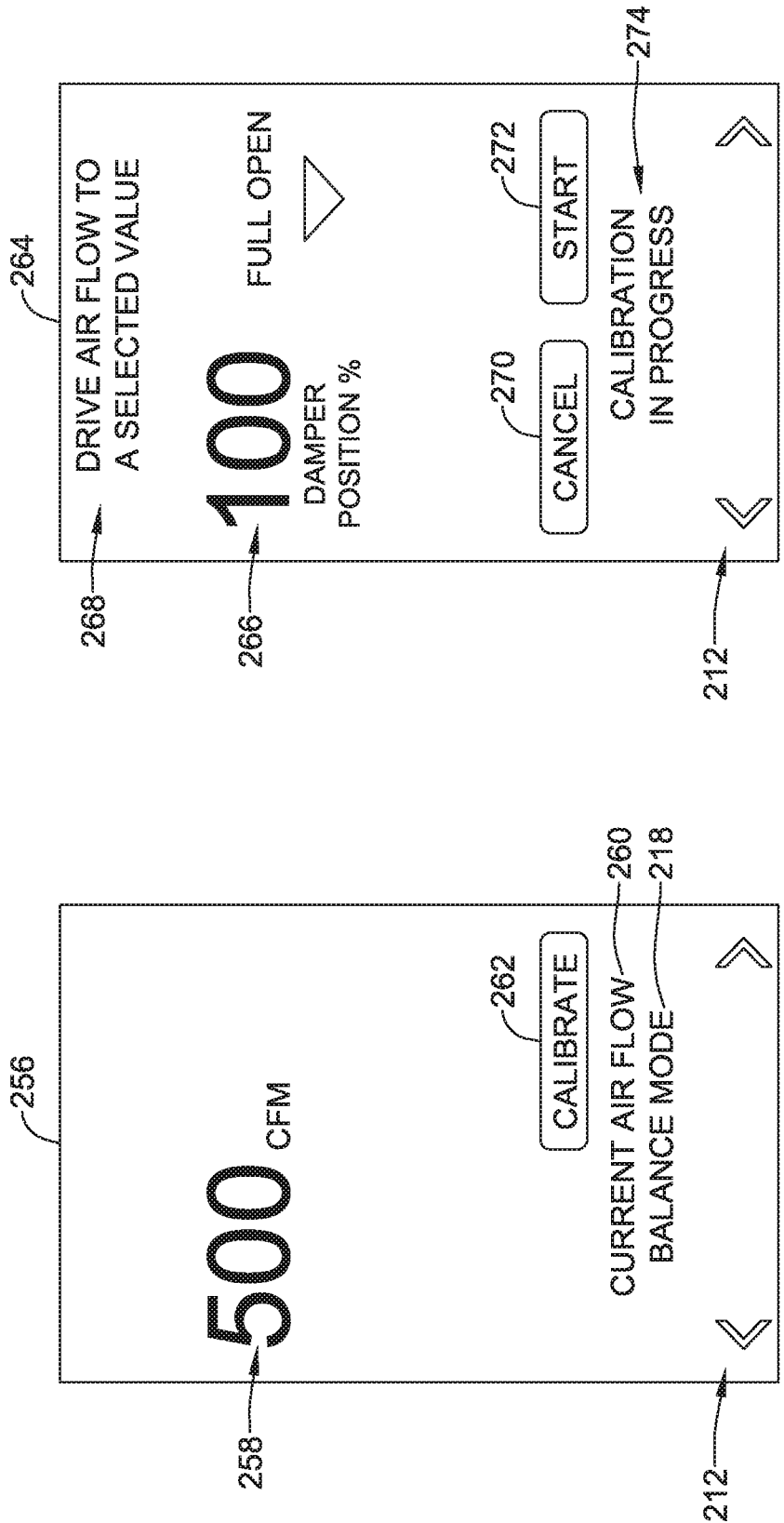

FIG. 26 shows a screen 256 in which the HVAC controller 34 displays a current air flow value 258. In this example, the HVAC controller 34 receives the current air flow value 258 from the VAV box itself, which is equipped to measure and communicate this information to the HVAC controller 34. The system is still in a balance mode, as indicated by the text message 218. The screen 256 includes text 260 to help provide context. A calibrate button 262 may be selected to begin a calibration process. Buttons 212 may be used, if desired, to move to a different screen.

FIG. 27 shows a screen 264 that may be displayed by the HVAC controller 34. The screen 264 includes text 268 that informs the user as to what is being done. A display 266 informs the user of the damper position, which as illustrated is 100% open. Text 274 informs the user that the calibration process is underway. A cancel button 270 permits the user to cancel the calibration process, if desired. A start button 272, if selected, instructs the HVAC controller 34 to proceed with the calibration. Similarly, FIG. 28 shows a screen 276 in which the damper position is 0% open, or fully closed, as indicated by the display 266. Buttons 212 may be used, if desired, to move to a different screen. In some cases, the HVAC controller 34 may automatically titrate by moving the damper position, receiving an updated air flow value 258 from the VAV box, and comparing the updated air flow value 258 with a desired air flow value, until a damper positioned is found that corresponds to the desired air flow value.

FIG. 29 shows a screen 278 that may be displayed by the HVAC controller 34. The screen 278 includes text 268 that informs the user as to what is being done. A display 280 allows a user to set a desired airflow, which as illustrated is minimum air flow of 50 CFM. An up and down arrow set 282 displays min flow and permits the user to adjust the minimum flow. Text 274 informs the user that the calibration process is underway. During the calibration process, the HVAC controller 34 may automatically titrate to fine the damper position that delivers the desired minimum air flow (e.g. 50 CFM). A cancel button 270 permits the user to cancel the calibration process, if desired. A start button 272, if selected, instructs the HVAC controller 34 to proceed. Similarly, FIG. 30 provides a screen 284 which can be used to determine the damper position that delivers the desired maximum air flow (e.g. 450 CFM). Buttons 212 may be used, if desired, to move to a different screen.

In some cases, there may be a desire to lock the damper in a particular position. FIG. 31 provides a screen 288 that may be displayed by the HVAC controller 34. The screen 288 includes a current air flow value 290 as well as an arrow set 292 that may be used to adjust the current air flow value 290. A display 294 provides the maximum air flow value and a display 296 provides the current damper position. A cancel button 270 permits the user to cancel the calibration process, if desired. A lock button 298 may be pressed to lock the damper position. Buttons 212 may be used, if desired, to move to a different screen.

The disclosure should not be considered limited to the particular examples described above. Various modifications, equivalent processes, as well as numerous structures to which the disclosure can be applicable will be readily apparent to those of skill in the art upon review of the instant specification.

We claim:

1. An HVAC controller configured to control a VAV box that includes a damper that has two or more damper positions to provide variable amounts of conditioned air to one or more downstream air vents of a building, the HVAC controller comprising:
   a housing;
   a temperature sensor housed by the housing and configured to sense a temperature proximate the HVAC controller;
   a user interface including a display housed by the housing, the user interface configured to display the sensed temperature and to enable a user to input a temperature set point;
   a controller housed by the housing and operatively coupled to the user interface and the temperature sensor, the controller is configured to regulate operation of the VAV box in accordance with the sensed temperature and the temperature set point; and
   wherein the controller is further programmed with a balance mode that is manually initiated via the user interface, wherein in the balance mode, the controller is configured to drive the damper of the VAV box to each of two or more damper positions and compare a measured air flow through the VAV box at each of the two or more damper positions to a corresponding desired air flow value.

2. The HVAC controller of claim 1, wherein in the balance mode, the controller is further configured to calibrate the HVAC controller based on the comparison of the measured air flow through the VAV box at each of the two or more damper positions to the corresponding desired air flow value.

3. The HVAC controller of claim 1, wherein in the balance mode, the controller is configured to titrate the damper position of the VAV box to find a damper position that results in a designated air flow through the VAV box.

4. The HVAC controller of claim 1, wherein the controller is configured to display one or more of a sensed temperature, a sensed humidity and a sensed carbon dioxide value on the display of the user interface, each value being displayed, if displayed, in a repeatable location on the display of the user interface.

5. The HVAC controller of claim 1, wherein the controller includes a plurality of modes including two or more of an operational mode, a temperature set point adjustment mode and the balance mode.

6. The HVAC controller of claim 1, wherein in the balance mode, the measured air flow through the VAV box is measured by a sensor that is associated with the VAV box and transmitted to the HVAC controller.

7. The HVAC controller of claim 1, wherein in the balance mode, the measured air flow through the VAV box is measured by a user and manually entered into the HVAC controller via the user interface of the HVAC controller.

8. The HVAC controller of claim 1, wherein the controller is configured to display a damper time value that is a programmable time value that dictates a time that the VAV box will take to move the damper between end positions, and is further configured to display up and down arrows for adjusting the damper time value.

9. The HVAC controller of claim 1, wherein in the balance mode, the controller is configured to display the measured air flow through the VAV box, and up and down controls for adjusting the measured air flow by adjusting the damper position of the VAV box.

10. The HVAC controller of claim 1, wherein the controller is configured receive a selection from a user via the user interface designated if the VAV box is servicing a single deck providing conditioned air to the VAV box or a dual deck including a cold deck providing conditioned cool air to the VAV box and a hot deck providing conditioned warm air to the VAV box.

11. The HVAC controller of claim 1, wherein in the balance mode, the controller is configured to:
sequentially drive the damper to each of the two or more damper positions;
display the damper position on the display of the user interface at each of the two or more damper positions;
obtain an indication of the measured air flow through the VAV box at each of the two or more damper positions; and
display the indication of the measured air flow through the VAV box at each of the two or more damper positions.

12. The HVAC controller of claim 1, further comprising a humidity sensor housed by the housing.

13. The HVAC controller of claim 1, further comprising a carbon dioxide sensor housed by the housing.

14. An HVAC system comprising:
a VAV box including a damper movable between several damper positions, the VAV box configured to provide variable amounts of conditioned air to one or more downstream air vents that service a space based on the damper position;
an HVAC controller mounted in the space serviced by the VAV box, the HVAC controller including a touch screen user interface configured to accept a temperature set point;
the HVAC controller is configured to control the VAV box in accordance with the temperature set point; and
wherein the HVAC controller is further configured to accept a selection of a user-initiated balance mode via the touch screen user interface, wherein in the user-initiated balance mode, the HVAC controller is configured to drive the damper of the VAV box to each of two or more damper positions and compare a measured air flow through the VAV box at each of the two or more damper positions to a corresponding desired air flow, and based on the comparison, calibrate one or more calibrated damper positions.

15. The HVAC system of claim 14, wherein the HVAC controller is further configured to display one or more of a sensed temperature, a sensed humidity and a sensed carbon dioxide value on the touch screen user interface, each value being displayed, if displayed, in a repeatable location on the touch screen user interface.

16. The HVAC system of claim 14, wherein in the user-initiated balance mode, the HVAC controller does not control the damper of the VAV box in accordance with the temperature set point.

17. The HVAC system of claim 14, wherein in the user-initiated balance mode, the measured air flow through the VAV box is measured by a sensor that is associated with the VAV box and transmitted to the HVAC controller.

18. The HVAC system of claim 14, wherein in the user-initiated balance mode, the measured air flow through the VAV box is measured by a user and manually entered into the HVAC controller via the touch screen user interface of the HVAC controller.

19. The HVAC system of claim 14, wherein the HVAC controller is programmed to:
sequentially drive the damper to each of the two or more damper positions;
display the damper position on the touch screen user interface at each of the two or more damper positions;
obtain an indication of the measured air flow through the VAV box at each of the two or more damper positions; and
display the indication of the measured air flow through the VAV box at each of the two or more damper positions.

20. A method of calibrating a VAV box that includes a damper and that is controlled by VAV controller that is mounted in a space of a building that is serviced by the VAV box, the method comprising:
accessing a calibration menu programmed into the VAV controller;
sequentially driving the damper of the VAV box to each of a plurality of predetermined damper positions;
displaying the predetermined damper position on a display of the VAV controller at each of the plurality of predetermined damper positions;
obtaining an indication of air flow through the VAV box at each of the plurality of predetermined damper positions; and
displaying the indication of air flow through the VAV box on the display of the VAV controller at each of the plurality of predetermined damper positions.

* * * * *